(12) United States Patent
Böttger et al.

(10) Patent No.: US 11,144,083 B2
(45) Date of Patent: Oct. 12, 2021

(54) TRANSMISSION ELEMENT AND ACTUATING DRIVE WITH A RETURN SPRING AND WITH A SELF-UNLOCKING GEAR LOCK

(71) Applicant: Siemens Schweiz AG, Zurich (CH)

(72) Inventors: Florian Erich Böttger, Baar (CH); Andreas Pally, Allenwinden (CH)

(73) Assignee: SIEMENS SCHWEIZ AG, Zurich (CH)

( * ) Notice: Subject to any disclaimer, the term of this patent is extended or adjusted under 35 U.S.C. 154(b) by 127 days.

(21) Appl. No.: 16/514,682

(22) Filed: Jul. 17, 2019

(65) Prior Publication Data

US 2020/0026322 A1  Jan. 23, 2020

(30) Foreign Application Priority Data

Jul. 20, 2018 (EP) .................................... 18184841

(51) Int. Cl.
| | | |
|---|---|---|
| G05G 5/05 | (2006.01) | |
| G05G 5/08 | (2006.01) | |
| F16H 33/02 | (2006.01) | |
| F16K 31/44 | (2006.01) | |

(52) U.S. Cl.
CPC .............. G05G 5/05 (2013.01); F16H 33/02 (2013.01); F16K 31/44 (2013.01); G05G 5/08 (2013.01)

(58) Field of Classification Search
CPC ........... F16H 33/02; F16H 33/06; G05G 5/05; G05G 5/08; G05G 17/00
See application file for complete search history.

(56) References Cited

U.S. PATENT DOCUMENTS

| | | | |
|---|---|---|---|
| 4,621,789 A | 11/1986 | Fukamachi | ............. 251/129.12 |
| 5,174,546 A | 12/1992 | Giordani | .................. 251/129.03 |
| 6,805,227 B2* | 10/2004 | Schunke | ................. F16D 49/00 |
| | | | 185/40 B |
| 2003/0178257 A1 | 9/2003 | Oh | .............................. 185/40 R |
| 2017/0122420 A1 | 5/2017 | Armstrong | ........................ 475/5 |
| 2017/0240071 A1* | 8/2017 | Umezaki | ................ A47C 1/025 |
| 2018/0038266 A1 | 2/2018 | Nonnenmann | ........... F01P 7/14 |
| 2020/0164833 A1* | 5/2020 | Owaki | ................ B60R 22/4676 |

FOREIGN PATENT DOCUMENTS

| | | | |
|---|---|---|---|
| EP | 3279534 A1 | 2/2018 | ............. F16K 31/04 |
| WO | 02/088560 A1 | 11/2002 | ............. F16D 49/00 |

* cited by examiner

*Primary Examiner* — Bobby Rushing, Jr.
(74) *Attorney, Agent, or Firm* — Slayden Grubert Beard PLLC

(57) ABSTRACT

Various embodiments include a transmission element for a spring return of an actuating drive comprising: a toothed wheel element with teeth at least in sections; and a locking element including a locking section for locking engagement in the teeth of the toothed wheel element to prevent a rotation of the toothed wheel element in a return direction. The locking element includes a safety element mechanically operatively connected to the locking section and elastically deformable in order to release the locking of the toothed wheel element by elastic deformation of the safety element at a torque of the toothed wheel element in the return direction greater than a safety torque limit.

10 Claims, 1 Drawing Sheet

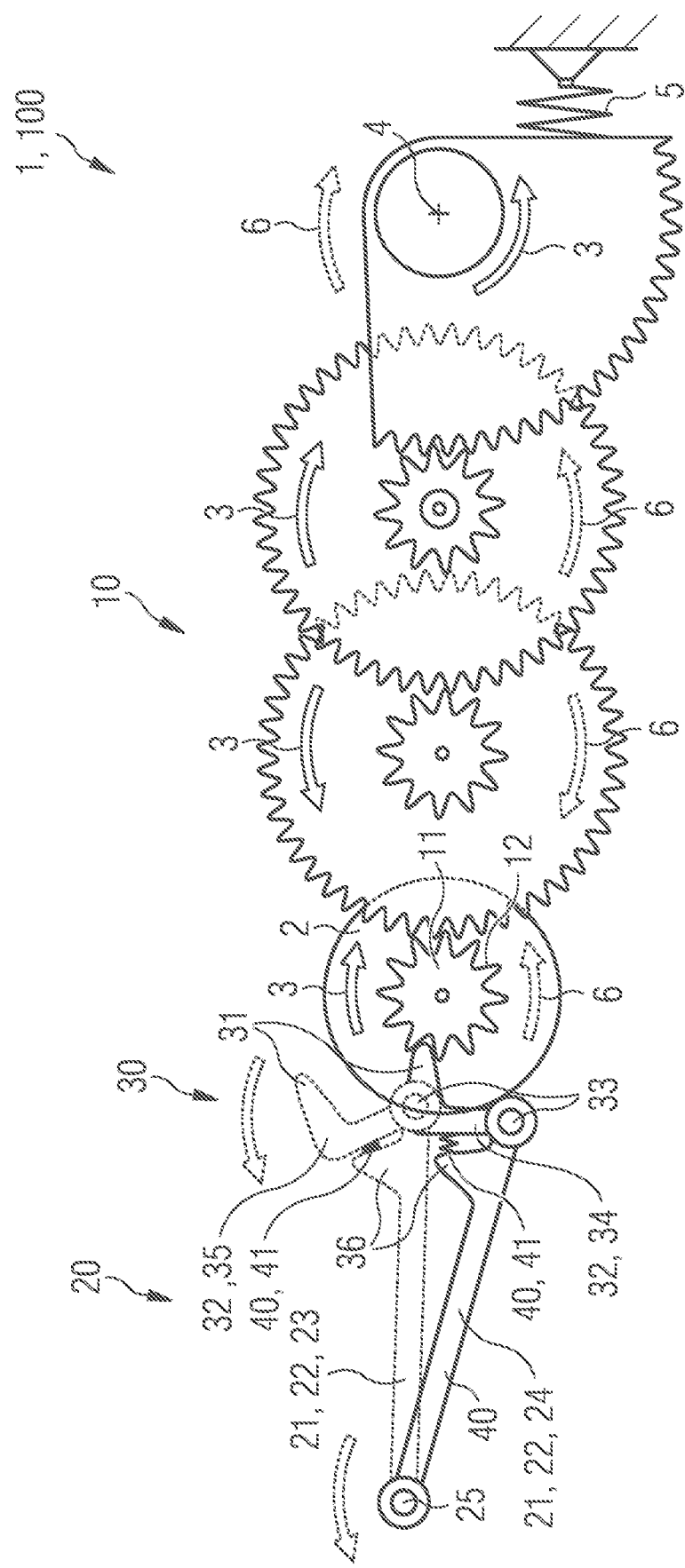

TRANSMISSION ELEMENT AND ACTUATING DRIVE WITH A RETURN SPRING AND WITH A SELF-UNLOCKING GEAR LOCK

CROSS-REFERENCE TO RELATED APPLICATIONS

This application claims priority to EP Application No. 18184841.7 filed Jul. 20, 2018, the contents of which are hereby incorporated by reference in their entirety.

TECHNICAL FIELD

The present disclosure relates to actuating drives. Various embodiments may include transmission elements for an actuating drive and/or actuating drives

BACKGROUND

Actuating drives with return springs—so-called spring-return actuating drives—and their transmission elements are known. A driven movement, in particular a rotation, can be provided in a first direction by such an actuating drive, in particular also by way of a transmission element of the control drive. In this movement, in particular driven by a motor, in the first direction, a return spring element is usually prestressed at the same time, which is provided to provide a second movement, the direction of movement of which is opposite to the first direction of movement. In this way, in the event of a power outage, the automatic provision of a return movement in the second direction of movement can be ensured.

A locking element is often integrated into a transmission element of the actuating drive by means of which a movement of the entire spring return can be blocked and released in a guided and/or controlled manner, in particular driven in the second direction of movement by the return spring element. One area of application of such actuating drives includes ventilation dampers in ventilation systems which are used to control flows of fluids, for example, air or other gases, in pipelines of the ventilation system.

In some applications, locking elements are used in the transmission elements of actuating drives to provide a blocking of a movement of the spring return. For this purpose, for example, a locking section of the locking element can engage in the teeth of a toothed wheel element of the transmission element of the spring return. The toothed wheel element and thus the entire transmission element are thereby blocked. In the case of a movement of the entire spring return and/or of the transmission element which in particular, for example, is forced by a user against the drive direction, simultaneous blocking by the locking element can lead to damage, for example, to the toothed wheel element or the locking element. Elaborate repair measures may be necessary in this case.

SUMMARY

The teachings of the present disclosure may at least partially eliminate the disadvantages described above in the case of transmission elements and actuating drives. In particular, embodiments of the teachings herein may provide and/or improve a transmission element for an actuating drive which makes it possible to operate the transmission element and/or the actuating drive as safely as possible in a particularly simple and cost-effective manner, wherein in particular, damage to the elements, in particular the transmission element, can also be prevented in the event of a forced movement in a return direction, and wherein furthermore a particularly compact embodiment of the components used is to be provided. In this case, features and details which are described in connection with a transmission element incorporating the teachings herein apply, of course also in connection with the actuating drive and vice versa, so that reference can always be made mutually to the individual aspects of the teachings of the present disclosure.

For example, some embodiments include a transmission element (10) for a spring return of an actuating drive (1), having at least one toothed wheel element (11) with teeth (12) at least in sections and a locking element (20), wherein the locking element (20) has a locking section (30) for locking engagement in the teeth (12) of the at least one toothed wheel element (11) to prevent a rotation of the at least one toothed wheel element (11) in a return direction (6), characterized in that the locking element (20) has a safety element (40) which is mechanically operatively connected to the locking section (30) and is at least partially elastically deformable in order to release the locking of the at least one toothed wheel element (11) by means of an elastic deformation of the safety element (40) at a torque of the at least one toothed wheel element (11) in the return direction (6) which is greater than a safety torque limit.

In some embodiments, the safety torque limit is greater than a torque which can be generated by a return spring element (5) of the spring return of the actuating drive (1) on the at least one toothed wheel element (11).

In some embodiments, the locking section (30) has a locking tooth (31) for engagement in the teeth (12) of the at least one toothed wheel element (11).

In some embodiments, the locking section (30) has a locking lever (32), wherein the locking lever (32) is rotatably mounted on a base element (21) of the locking element (20) around a locking axle (33), and wherein moreover the locking lever (32) can be brought from a functional position (34) into a safety position (35) by means of the elastic deformation of the safety element (40).

In some embodiments, the safety element (40) is designed as a safety spring element (41) mechanically operatively connected to the locking lever (32).

In some embodiments, the locking element (20) has a locking stop (36) to limit and/or define the safety position (35) of the locking lever (32).

In some embodiments, the safety spring element (41) is arranged between the locking stop (36) and the locking lever (32).

In some embodiments, the locking element (20) has a base lever element (22), wherein the base lever element (22) is rotatably mounted on a base axle (25) and the locking section (30) is arranged at a distance from the base axle (25) on the base lever element (22), and wherein moreover the base lever element (22) can be brought into a release position (23) in which the locking section (30) releases the at least one toothed wheel element (11), and into a locking position (24), in which the locking section (30) engages in the at least one toothed wheel element (11) in a locking fashion.

In some embodiments, the base lever element (22) comprises the safety element (40), in particular that the base lever element (22) forms the safety element (40).

As another example, some embodiments include an actuating drive (1) having a drive element (2), an output connection (4), a return spring element (5) and a transmission element (10), wherein the drive element (2) is mechanically operatively connected by way of the transmission element (10) to the output connection (4) to drive the output connection (4) in a drive direction (3) and wherein the return spring element (5) is mechanically operatively connected to the drive element (2) and/or the transmission element (10) and/or the output connection (4) to provide return functionality, characterized in that the transmission element (10) is designed as described above.

BRIEF DESCRIPTION OF THE DRAWING

Other advantages, features and details of the teachings herein will become apparent from the following description in which an exemplary embodiment of the invention is described in detail with reference to the diagram. The diagram shows an actuating drive incorporating the teachings herein with a self-unlocking lockable transmission element.

DETAILED DESCRIPTION

Some embodiments include a transmission element for an actuating drive having at least one toothed wheel element with teeth at least in sections and a locking element, wherein the locking element has a locking section for locking engagement in the teeth of the at least one toothed wheel element to prevent a rotation of the at least one toothed wheel element in a return direction. A transmission element as described in this disclosure includes an element wherein the locking element has a safety element which is mechanically operatively connected to the locking section and is at least partially elastically deformable in order to release the locking of the at least one toothed wheel element by means of an elastic deformation of the safety element at a torque of the at least one toothed wheel element in a return direction which is greater than a safety torque limit.

A transmission element as described herein may be used in an actuating drive, i.e. in a spring return of an actuating drive. In other words, the transmission element in the actuating drive may mechanically transmit a drive movement of a drive of the control drive to an output section, wherein a rotary speed or torque of the movement in the drive direction can be changed by the transmission element. At the same time, such actuating drives usually have a return spring element which is prestressed in a drive direction during a movement of the entire transmission element.

When the spring return in the actuating drive is triggered, the return spring element releases the mechanical energy stored in it via the transmission element which then moves in a return direction opposite to the drive direction. In some embodiments, a movement may include a rotation of toothed wheels or toothed wheel elements of the transmission element. In order to prevent unintentional movement of the transmission element and thus of the entire spring return in the return direction, a transmission element has a locking element. In some embodiments, a locking element comprises a locking section which is designed for a locking engagement in the teeth of a toothed wheel element of the transmission element, for example by means of a corresponding form and/or three-dimensional embodiment. The teeth of the at least one toothed wheel element can be provided at least in sections on the at least one toothed wheel element, but in some cases even completely encircling. A movement, in particular a rotation, of the at least one toothed wheel element is prevented by an engagement of the locking section in these teeth, whereby the entire transmission element, and thus the entire spring return, is blocked with regard to a movement, in particular in the return direction.

A transmission element for an actuating drive may increase safety when operating the transmission element and the actuating drive. This can be provided in particular by the fact that the locking element has a safety element mechanically operatively connected to the locking section. In some embodiments, this safety element is at least partially elastically deformable. For this purpose, the safety element may comprise a corresponding material, for example a spring steel, an elastically deformable plastic material, or the like. In some embodiments, the locking of the locking section on the teeth of the at least one toothed wheel element can be canceled or released by an elastic deformation of the safety element. In other words, the engagement of the locking section in the teeth of the at least one toothed wheel element is terminated by an elastic deformation of the safety element.

This can be provided, for example, in particular by the locking section being moved away from the position in which it engages in the teeth of the at least one toothed wheel element by means of the elastic deformation of the safety element and the mechanical operative connection between the safety element and the locking section. During operation of the transmission element, safety is increased in particular by the fact that this elastic deformation of the safety element takes place as a function of a torque acting on the at least one toothed wheel element in the return direction.

In some embodiments, the elastic deformation of the safety element will only occur or at least only occur effectively when the torque acting on the toothed wheel element is greater than a safety torque limit. In other words, the at least one toothed wheel remains locked by the engagement of the locking section in the teeth, as long as the torque acting on the at least one toothed wheel in a return direction is smaller than the safety torque limit. A basic functionality of the transmission element as part of a spring return in the actuating drive, in particular an especially controllable and/or regulatable blocking of a movement of the transmission element in the return direction, can be ensured in this way. At the same time, if the torque acting on the at least one toothed wheel element is greater than the safety torque limit, the locking or blocking of the at least one toothed wheel element can be automatically canceled by the elastic deformation of the safety element. In other words, the torque of the at least one toothed wheel element acts in the return direction on the locking section which engages in the teeth, and thus, by way of the corresponding mechanical operative connection, also on the safety element. In the case of a torque which is smaller than the safety-torque limit, this remains at least essentially without consequences, in particular, no deformation or only a little or preferably only insignificant deformation of the safety element takes place. As a result, the locking section remains in its blocking engaging position.

However, if the torque in the return direction of the toothed wheel element exceeds the safety torque limit, then an elastic deformation of the safety torque now takes place, and as a result of the mechanical operative connection to the locking section, this is moved in such a way that the engagement in the teeth of the at least one toothed wheel element is terminated. In this way, a movement of the entire toothed wheel element and thereby the spring return in the return direction can be made possible. Damage, in particular to the locking section and/or the at least one toothed wheel element, can be prevented in this way. Due to the presence of the safety element, it is possible in particular to dispense with additional, in particular externally present and mechanically complex, devices which according to the prior art provide corresponding safety when operating a spring return with a transmission element. The required structural space can be reduced in this manner, with all the associated advantages, for example with regard to production costs and/or production duration.

In some cases, an inelastically deformable safety element would serve for a single occasion, so that in this case further use of the transmission element is often no longer possible as the deformation of the safety element is permanent. The described increase in safety provided during the operation of the transmission element can then no longer be provided.

In some embodiments, the safety torque limit is greater than a torque which can be generated by a return spring element of the spring return in the actuating drive on the at least one transmission element. The locking element and its locking section of the transmission element are used, in particular, to provide a return functionality of the spring return. Such a return functionality comprises a movement of the entire spring return in the return direction, driven by a return spring element, is only provided if, guided and/or controlled by the locking element, this movement is actively enabled by releasing the at least one toothed wheel element.

By means of a safety torque limit which is greater than a torque which can be generated by a return spring element of the spring return on the at least one toothed wheel element, this can be ensured in a particularly simple manner. All movements which could be triggered by the return spring element can thus be reliably blocked and/or released by a locking element of a transmission element. Only with additional, in particular greater, torques, can and will the elastic deformation of the safety element occur. A return functionality can thus be provided by a transmission element without restrictions for use in a spring return.

In some embodiments, the locking section has a locking tooth for engaging in the teeth of the at least one toothed wheel element. Such a locking tooth may in particular be adjusted to the teeth of the at least one toothed wheel element, for example with regard to a shape of the flanks, the number of teeth and/or an angle of repose of the teeth of the at least one toothed wheel element. A particularly good and, in particular, positive engagement of the locking section in the teeth of the at least one toothed wheel element can thus be provided in a simplified manner.

In some embodiments, the locking section has a locking lever, wherein the locking lever is rotatably mounted around a locking axle on a base element of the locking element, and wherein moreover the locking lever can be brought from a functional position into a safety position by means of the elastic deformation of the safety element. A further degree of freedom for a movement of the entire locking element can be provided by such a locking lever, which is rotatably mounted around a locking axle on a base element of the transmission element.

Thus, for example, a locking tooth can be arranged on an end of the locking lever facing away from the locking axle. In some embodiments, the locking tooth is designed to engage the teeth of the at least one transmission element in the functional position of the locking lever, wherein such engagement in the teeth of the at least one toothed wheel element is canceled in the safety position of the locking lever in which the locking lever is rotated around the locking axle at a safety angle. In particular, by providing such a locking lever, the entire locking element for providing the safety functionality of a transmission element does not need to be pivoted and/or moved.

In some embodiments, the safety element comprises a safety spring element mechanically operatively connected to the locking lever.

Such a safety spring element may, for example, be a spiral spring, a leaf spring or the like. Springs are particularly simple, elastically deformable safety elements. A transmission element according to the invention can thus be further simplified in this way.

In some embodiments, the locking element has a locking stop for limiting and/or defining the safety position of the locking lever. The locking lever in its safety position is arranged in particular inside the transmission element such that engagement of the safety section in the teeth of the at least one toothed wheel element is no longer possible. In order to define or limit this safety position, a locking stop can particularly preferably be provided in which, for example, the locking lever rests positively when it is in its safety position. Further movement of the locking lever beyond the safety position can thus be prevented by such a locking stop. A particularly compact embodiment of a transmission element can be provided in this manner.

In some embodiments, the safety spring element is arranged between the locking stop and the locking lever. By arranging the safety spring element between the locking stop and the locking lever, the safety spring element, for example embodied as a spiral spring, can be arranged in a particularly space-saving manner and overall, also provided in a particularly small size and with little requirement for space. The compactness of a transmission element, in particular the locking element of the transmission element, can be further increased thereby.

In some embodiments, the locking element has a base lever element, wherein the base lever element is rotatably mounted on a base axle and the locking section is arranged at a distance from the base axle on the base lever element, and wherein the base lever element can also be moved into a release position in which the locking section releases the at least one toothed wheel element, and into a locking position in which the locking section engages in the at least one toothed wheel element in a locking manner. A controllable and/or adjustable movement of the entire locking section for providing the actual locking function of the locking element can be provided in a particularly simple manner by a base lever element of this type which can, for example, form a base element of the transmission element.

For this purpose, the locking section of the locking element can be arranged at a distance from the base axle on the base lever element, whereby in the case of a rotation of the base lever element around the base axle, the locking section is automatically moved with a larger radius of movement due to the distance from the base axle. In some embodiments, the locking section moves to such an extent that it can be moved between a release position in which the locking section releases the at least one toothed wheel element, and a locking position in which the locking section engages in the at least one toothed wheel element in a locking manner. This can be carried out in particular in a regulated and/or controlled manner, in such a way that a regulated and/or controlled triggering of the return functionality of the spring return can be provided in a particularly simple manner by means of a transmission element incorporating the teachings herein.

In some embodiments, the base lever element comprises the safety element, in particular that the base lever element forms the safety element. In other words, the base lever element is designed to be elastically deformable at least in sections. For this purpose, the base lever element can, for example, consist of or comprise an elastically deformable material, for example spring steel and/or an elastically deformable plastic material. On the one hand it can be provided that the base lever element forms the safety element in sections, wherein for example, a limited section between the basic axle and the locking section is designed to be elastically deformable. In some embodiments, the entire base lever element can also be designed to be elastically deformable and thus forms the safety element in its entirety. In this way, particularly many different embodiments of the base lever element, in particular adapted to the respective conditions and requirements of the transmission element, can be provided.

In some embodiments, there is an actuating drive having a drive element, an output connection, a return spring element and a transmission element, wherein the drive element is mechanically operatively connected by way of the transmission element to the output connection to drive the output connection in a drive direction, and wherein the return spring element is mechanically operatively connected to the drive element and/or the transmission element and/or the output connection to provide a return functionality. An actuating drive is characterized in that the transmission element is designed as described above.

In some embodiments, an actuating drive has the basic components of a spring return, in particular a drive element, i.e. a motor for providing drive functionality in a drive direction, an output connection, i.e. a control connection for forwarding the movement provided by the drive and in particular a transmission element for mechanically operatively connecting the drive element and the output connection. The actuating drive also has a return spring element which is prestressed in the drive direction by the drive element when the spring return is operated, wherein in the case of a release of the spring return, for example by means of a locking element of the transmission element, the return spring element causes the entire spring return to be driven in a return direction. In other words, a return functionality can be provided by means of this return spring element which is mechanically operatively connected to the drive element and/or the transmission element and/or the output connection. All the advantages that have been described in detail with respect to a transmission element incorporating the teachings herein can thus also be provided by an actuating drive comprising such a transmission element.

The single FIGURE shows an example actuating drive 1 incorporating the teachings of the present disclosure. A housing surrounding the actuating drive 1 is not shown for reasons of clarity. Due to its spring return, in particular a mechanical drive energy of a drive element 2, here an electric motor, can be transmitted to an output connection or control connection 4. At the control connection 4, in particular, a ventilation flap or a valve can be connected in a mechanically operative manner. Via a transmission element 10, a mechanically operative connection between the drive element 2 and the control port 4 can be provided. The drive element 2 provides a movement in a drive direction 3. In the case of such a movement of the entire spring return, in particular also of the transmission element 10, in a drive direction 3, the return spring element 5 of the spring return is prestressed.

In order to prevent an immediate movement of the transmission element and thus of the spring return of the actuating drive when the drive element is switched off in the return direction, the transmission element 10 in particular has a locking element 20. A locking section 30 of the locking element 20 is designed to engage positively in the teeth 12 of a toothed wheel element 11 of the transmission element 10. In this way, a movement of the transmission element 10 and thus of the entire spring return movement in the return direction 6 can be blocked. This state is shown in solid lines in the single FIGURE with respect to the locking element 20.

In addition to the locking section 30 with the locking tooth 31, the locking element 20 has a base lever element 22 as the base element 21. This base lever element 22 is rotatably mounted around a base axle 25 and is shown in the solid representation in its locking position 24. In this locking position 24 of the locking element 20, the part of the locking section 30 which is designed as a locking tooth 31 engages in the teeth 12 of the at least one toothed wheel element 11 and blocks it. At the same time, the locking section 30 has a locking lever 32 which is rotatably mounted around a locking axle 33 and is shown in the solid representation in its functional position 34, in which the locking tooth 31 is designed for positive engagement in the teeth 12 of the toothed wheel element 11. Further components of the locking element 20 are a locking stop 36 and a safety spring element 41 arranged between the locking stop 36 and the locking lever 32, which will be described below.

It may be problematic if one movement of the transmission element 10 or the entire spring return of the actuating drive 1 is forced in the return direction 6 or is to be carried out forcibly from the outside, in particular if the at least one toothed wheel element 11 is blocked by an engagement of the locking section 30 in the teeth 12. This can occur, for example, in the event of an unnecessary movement of a ventilation flap connected to the control connection 4 in the return direction 6 by a user. In order to prevent damage, for example, to the at least one toothed wheel element 11 and/or the locking section 30, which in particular has a locking tooth 31 in the embodiment shown, the locking element 20 of the transmission element 10 according to the invention is specially designed.

In particular, the locking element 20 has a safety element 40 which is mechanically operatively connected to the locking section 30 and is at least partially elastically deformable. In the embodiment shown, the safety element 40 may comprise a safety spring element 41 which can be arranged between a locking lever 32 and a locking stop 36.

In some embodiments, a base lever element 22 may also comprise the safety element 40 or form this. The locking lever 32 is rotatably mounted around a locking axle 33 on a base element 21 of the locking element 20, here a base lever element 22. By means of elastic deformation of the safety spring element 41 during a movement of the toothed wheel element 11 in the return direction 6, wherein the torque generated by this movement is in particular greater than a safety-torque limit, the at least partially elastically deformable safety element 40 can now be elastically deformed, whereby a release of the engagement of the locking section 30 of the locking element 20 in the teeth 12 of the toothed wheel element 11 of the transmission element 10 is canceled. This is shown in broken lines in the single FIGURE with respect to the locking element 20. It is clearly visible, on the one hand, that the locking lever is moved from its functional position 34 into its safety position, this being able to be provided in particular by the elastic deformation of the safety spring element 41.

At the same time, this safety position 35 can be defined and in particular restricted to a limited extent by the locking stop 36. At the same time, the base lever element 22 can also move out of its locking position 24 into its release position 23, as a result of which the positive engagement of the locking tooth 31 in the teeth 12 of the toothed wheel element 11 can be prevented or canceled even more reliably. At the same time, in order to also be able to safely provide a return functionality of the spring return 1, the safety torque limit can be chosen such that it is greater than a torque which can be generated by the return spring element 5 of the spring return on the at least one toothed wheel element 11. At a torque generated by the return spring element 5, no deformation or only insignificant deformation of the safety element 40 thus occurs, whereby the at least one toothed wheel element 11 continues to be blocked by the locking section 30.

To summarize, by means of a transmission element 10 incorporating the teachings herein for an actuating drive 1, safety can thus be increased when operating the spring return and/or the actuating drive 1, without in particular impairing a return functionality for a spring return. In the case of movements, in particular also generated externally, of the transmission element 10 in the return direction 6, these can be blocked as long as a torque lies beneath a safety torque limit. This safety torque limit can in particular provide that on the one hand, the return functionality of the spring return of the actuating drive 1 can be provided, and at the same time, damage to the elements of the spring return by the excessive impact of a torque in the return direction 6 can be safely avoided. The functionality can in particular be provided by the presence of an elastically deformable safety element 40 by means of which, in particular, the engagement of the locking section 30 in the teeth 12 of the toothed wheel element 11 is achieved before such damage can occur.

LIST OF REFERENCE CHARACTERS

1 Actuating drive
2 Motor, electric motor, drive element
3 Drive direction
4 Control connection, output connection
5 Return spring element
6 Return direction
10 Transmission element
11 Toothed wheel element
12 Teeth
20 Locking element
21 Base element
22 Base lever element
23 Release position
24 Locking position
25 Base axle
30 Locking section
31 Locking tooth
32 Locking lever
33 Locking axle
34 Functional position
35 Safety position
36 Locking stop
40 Safety element
41 Safety spring element

The invention claimed is:

1. A transmission element for a spring return of an actuating drive, the transmission element comprising:
  a toothed wheel element with teeth at least in sections; and
  a locking element including a locking section for locking engagement in the teeth of the toothed wheel element to prevent a rotation of the toothed wheel element in a return direction;
  wherein the locking element includes a safety element mechanically operatively connected to the locking section and elastically deformable in order to release the locking of the toothed wheel element by elastic deformation of the safety element at a torque of the toothed wheel element in the return direction greater than a safety torque limit.

2. The transmission element as claimed in claim 1, further comprising a return spring element;
  wherein the safety torque limit is greater than a torque which can be generated by the return spring element on the toothed wheel element.

3. The transmission element as claimed in claim 1, wherein the locking section comprises a locking tooth for engagement in the teeth of the toothed wheel element.

4. The transmission element as claimed in claim 1, wherein:
  the locking section includes a locking lever rotatably mounted on a base element of the locking element around a locking axle; and
  the locking lever moves from a functional position into a safety position because of elastic deformation of the safety element.

5. The transmission element as claimed in claim 4, wherein the safety element comprises a safety spring element mechanically connected to the locking lever.

6. The transmission element as claimed in claim 4, wherein the locking element includes a locking stop to limit and/or define the safety position of the locking lever.

7. The transmission element as claimed in claim 5, wherein the safety spring element is disposed between the locking stop and the locking lever.

8. The transmission element as claimed in claim 1, wherein:
  the locking element includes a base lever element
  the base lever element is rotatably mounted on a base axle;
  the locking section is arranged at a distance from the base axle on the base lever element; and
  the base lever element moves between a release position in which the locking section releases the toothed wheel element, and a locking position in which the locking section engages in the toothed wheel element in a locking fashion.

9. The transmission element as claimed in claim 8, wherein the base lever element comprises the safety element.

10. An actuating drive comprising:
  a drive element;
  an output connection;
  a return spring element; and
  a transmission element;
  wherein the drive element is mechanically connected by the transmission element to the output connection to drive the output connection in a drive direction;
  the return spring element is mechanically connected to at least one of: the drive element, the transmission element, and the output connection to provide return functionality; and
  the transmission element comprises:
    a toothed wheel element with teeth at least in sections; and
    a locking element including a locking section for locking engagement in the teeth of the toothed wheel element to prevent a rotation of the toothed wheel element in a return direction;
  wherein the locking element includes a safety element mechanically operatively connected to the locking section and elastically deformable in order to release the locking of the toothed wheel element by elastic deformation of the safety element at a torque of the toothed wheel element in the return direction greater than a safety torque limit.

* * * * *